United States Patent [19]
Takagi et al.

[11] Patent Number: 5,661,709
[45] Date of Patent: Aug. 26, 1997

[54] DIGITAL SIGNAL DETECTION CIRCUIT

[75] Inventors: Genzo Takagi, Urawa; Yoshihiro Noguchi, Kawasaki; Eizo Katayama, Yokohama; Mitsuhiro Araki, Kawasaki; Yoshinori Takahashi, Warabi, all of Japan

[73] Assignee: Matsushita Electric Industrial Co., Ltd., Osaka, Japan

[21] Appl. No.: 689,130

[22] Filed: Jul. 30, 1996

Related U.S. Application Data

[63] Continuation of Ser. No. 223,508, Apr. 6, 1994, abandoned.

[30] Foreign Application Priority Data

Apr. 6, 1993 [JP] Japan ..................... 5-079748

[51] Int. Cl.⁶ ........................................ G11B 7/00
[52] U.S. Cl. ............................... 369/59; 369/124
[58] Field of Search ............... 369/59, 124, 13; 371/43, 45; 307/464; 360/40, 45, 46; 375/96, 262; 329/308; 331/12

[56] References Cited

U.S. PATENT DOCUMENTS

| | | | |
|---|---|---|---|
| 4,641,327 | 2/1987 | Wei | 375/365 |
| 4,885,757 | 12/1989 | Provence | 375/96 |
| 5,050,191 | 9/1991 | No | 375/94 |
| 5,089,917 | 2/1992 | Kanota et al. | 360/45 |
| 5,095,392 | 3/1992 | Shimazaki et al. | 360/40 |
| 5,111,483 | 5/1992 | Serfaty | 375/94 |
| 5,134,635 | 7/1992 | Hong et al. | 375/94 |
| 5,243,605 | 9/1993 | Lekmine et al. | 371/43 |
| 5,270,876 | 12/1993 | Inoue et al. | 360/46 |
| 5,291,499 | 3/1994 | Behrgns et al. | 371/43 |
| 5,341,387 | 8/1994 | Nguyen | 371/45 |
| 5,363,352 | 11/1994 | Tobita et al. | 364/13 |

FOREIGN PATENT DOCUMENTS

| | | |
|---|---|---|
| 385867 | 5/1990 | European Pat. Off. . |
| 2-226981 | 9/1990 | Japan . |

*Primary Examiner*—Nabil Hindi
*Attorney, Agent, or Firm*—Lowe, Price, LeBlanc & Becker

[57] ABSTRACT

A digital signal detection circuit includes a threshold value calculator calculating a threshold value from assumptive sampled values corresponding to various data patterns of a regenerated signal. The regenerated signal is obtained by regenerating data recorded on a recording medium by a regenerating head. The detection circuit also includes a Viterbi decoder carrying out Viterbi decoding of the regenerated signal with the threshold value determined by the threshold value calculator as a constant. The threshold value calculator variably controls the threshold value using a decoded output of the Viterbi decoder and a regenerated signal corresponding to the decoded output of the Viterbi decoder.

7 Claims, 9 Drawing Sheets

DIGITAL SIGNAL DETECTION CIRCUIT

This application is a continuation of application Ser. No. 08/223,508 filed Apr. 6, 1994 now abandoned.

BACKGROUND OF THE INVENTION

1. Field of the Invention

The present invention relates to a digital signal detection circuit used to decode an input signal whose waveform has been interfered or disturbed. The detection circuit uses a Viterbi decoding technique.

2. Prior Art

It is known for years that an optical disk system which regenerates binary data having been recorded in an optical disk includes a digital signal detection circuit employing Viterbi decoding techniques to regenerate a signal for the purpose of decreasing a data error rate of high-density recorded data.

FIG. 11 is a block diagram of this digital signal detection circuit. In the digital signal detection circuit of FIG. 11, digital data, which have been converted from 8-bit form to 10-bit form (according to a technique to convert the data from 8-bit form to 10-bit form in order to allow a frequency characteristic of the data to be DC component free) and recorded in an optical disk 101, are read by a light pickup head 102 driven by a laser driving circuit 103 to regenerate an analog signal. The regenerated analog signal is applied to a RF amplifier 104 to be amplified, then passed through an HPF 105 in order to cut out DC offset components from an output of the RF amplifier 104. An output signal of the HPF 105 is passed through an AGC circuit 106 to have a constant amplitude. An analog output signal of the AGC circuit 106 is converted into a digital signal by an A/D converter 107. A waveform of an output signal from the A/D converter 107 is shaped by a digital equalizer 108. A Viterbi decoder 109 decodes an output the digital equalizer 108 in Viterbi decoding technique to detect binary data. An 8 to 10-bit inversely converting circuit inversely converts output data of the Viterbi decoder 109 from 10-bit form into 8-bit form and outputs converted data. A signal amplified by the RF amplifier 104 is also applied to a PLL 111. The PLL 111 synchronizes a phase of the inputted signal and outputs it as a sampling clock signal in bit cycles to the A/D converter 107. The A/D converter 107 converts an output signal from the AGC circuit from analog to digital at a timing of the sampling clock supplied from the PLL 111.

It is supposed that an ideal single regenerated waveform obtained by reading out an analog regenerated waveform from the optical disk by the light pickup head 102 has a level value a1 at sampling points of $t_0$ and $t_1$ in bit cycles and a level value $a_0$ (i.e., an optical offset component) at all sample points except for the sampling points t0,t1, as shown in FIG. 7. Accordingly, a range influenced by waveform interference is for two sampling points. If continuous data are recorded, a resulting waveform is a super position of the above ideal single regenerated waveforms, each of which is offset at every sampling point from a preceding one. The regenerated waveform of the continuous data has, as shown in FIG. 8, three level values $a_0$, $a_1$ and $a_2$ at every sampling point (provided $a_2 = 2a_1 - a_0$). When the HPF 105 gets rid of the DC offset components from the waveform obtained by the addition besides the AGC circuit 106 causes the regenerated signal to have an amplitude of ±1, a resulting waveform is shown in FIG. 9. In this case, level values of the sampling points are −1, 0 and 1. A relation between the recorded data and level values (assumptive sampled values) of the waveform is represented by a trellis diagram, as shown in FIG. 10.

Viterbi decoder 109 performs a Viterbi decoding operation with three waveform values −1, 0 and 1 as the assumptive sampled values. The recorded data have been modulated (a conversion from 8-bit form to 10-bit form) to be free from DC components, since if the recorded data contain the DC components, information of the data will be cut out by the HPF.

The Viterbi decoding operation is to calculate an Euclidean distance between an assumptive sampled value and an actual value of each path at a sampling point according to the trellis diagram shown in FIG. 10, add sum totals of the Euclidean distances for an input waveform up to one clock before corresponding thereto to determine a sum total of each path, and select one having a smaller sum total of the Euclidean distances between two paths inputted to each state to hold it as a surviving path. At this time, there exists one path in each state. A path having a smaller sum total of the Euclidean distances between the two survivor paths is selected as the maximum likelihood path so that a path is decided by tracing back a train of such selected paths up to a predetermined number of samples (12 samples before in this case) to obtain decoded data from the path. A sum total of the Eucliden distances of the surviving paths calculated here is next used to calculate a sum total of Euclidean distances at the next sampling point. Repetition of the above operation at every sampling point permits demodulation of the data. The decoded data DT are thus outputted, delayed a predetermined number of samples.

A threshold value S5 required for the Viterbi decoder 109 is a constant used to calculate an Euclidean distance between an assumptive sampled value and an actual sampled value. A calculation of an Euclidean distance between an assumptive sampled value and an actual sampled value is carried out in the following fashion. Here, assumed that an actual sampled value is $y_i$, an assumptive sampled value are three values, −1, 0 and 1. When the assumptive sampled value is −1, a square of an error $r_{0i}$ is given by a formula:

$$r_{0i} = (y_i - (-1))^2 \quad (1)$$
$$= y_i^2 + 2y_i + 1$$

When the assumptive sampled value is 0, a square of an error $r_{1i}$ is given by a formula:

$$r_{1i} = (y_i - 0)^2 \quad (2)$$
$$= y_i^2$$

And, when the assumptive sampled value is 1, a square of an error is given by a formula:

$$r_{2i} = (y_i - 1)^2 \quad (3)$$
$$= y_i^2 - 2y_i + 1$$

In order to simplify Calculation of the above formulae (1), (2) and (3), $y_i^2$ is subtracted from each formula and each resulting formula is divided with 2 to be regularized. As a result, formula (1) becomes:

$$r'_{0i} = y_i + 0.5 \quad (4)$$

Formula (2) becomes:

$$r'_{1i} = 0 \quad (5)$$

And formula (3) becomes:

$$r'_{2i} = -y_i + 0.5 \qquad (6)$$

The above three formulae (4), (5) and (6) are used to calculate an Euclidean distance. Therefore, a constant 0.5 necessary for each of the formulae (4), (5) and (6) is a threshold value S5.

The conventional digital signal detector however has a certain disadvantage. In order to give a constant amplitude to a regenerated analog signal in the AGC circuit 106, it is necessary to provide the HPF 105 to get rid of DC components from the regenerated analog signal so as to prevent an automatic gain control from carrying out with an offset signal (i.e., optical offset, electrical offset, etc.) of the regenerated analog signal. If data recorded in the disk contain DC components, data information is eliminated by the HPF 105. As a result, accurate signal detection becomes impossible. In the above conventional system, data are previously converted from 8-bit form to 10-bit form to prevent the data recorded in the disk from containing any DC component. The conventional digital signal detecting circuit therefore needs to include the 8-to-10 bit inverse-converter 110 therein. Since the 8-to-10 bit inverse-converter 110 converts 8-bit data into 10-bit data, the original data are added t for two redundant bits, causing a lower recording density of the disk.

An object of this invention is to overcome the above disadvantage by providing a digital signal detecting circuit being capable of detecting a digital signal without requiring an 8-to-10 bit inverse-conversion of the signal to eliminate DC components from data having been recorded in a disk.

SUMMARY OF THE INVENTION

The present invention therefore provides a digital signal detection circuit comprising a threshold value calculator calculating a threshold value of assumptive sampled values corresponding to various data patterns of a regenerated signal obtained by regenerating data recorded on a recording medium by a regenerating head, and a Viterbi decoder carrying out Viterbi decoding of said regenerated signal with the threshold value determined by the threshold value calculator as a constant, said threshold value calculator variably controlling the threshold value using a decoded output of the Viterbi decoder and a regenerated signal corresponding to said decoded output.

According to the present invention, the Viterbi decoder calculates a square of an error between an assumptive sampled signal and an actually sampled signal of a regenerated signal based on a threshold value to carry out Viterbi decoding using a calculated result as Euclidean distance. The threshold-value calculator separately integrates, on the basis of a result of the Viterbi decoding, the sampled value of the regenerated signal corresponding thereto for each assumptive sampled value and calculates a threshold value from the integrated assumptive sampled values, thereby determining an optimal threshold value for an actual regenerated signal. A combination of an output of the Viterbi decoder and a threshold value calculator permits accurate digital signal detection without a HPF and an AGC circuit;

Although the conventional digital signal detection circuit carries out Viterbi decoding with a constant threshold value in an automatic gain control by passing a regenerated signal having been converted from an 8-bit form into a 10-bit form through a HPF, the digital signal detection circuit of this invention is provided with a threshold value calculator which can variably control the assumptive sampled values corresponding to various data patterns on the basis of a result of the Viterbi decoding, the Viterbi decoding being carried out with a threshold value calculated from the assumptive sampled values that have been variably controlled, thereby accomplishing a digital signal detection that enables regeneration of high-density recorded data of an optical disk without requiring a previous 8-to-10 conversion of the data.

BRIEF DESCRIPTION OF THE DRAWINGS

FIG. 1A is a schematic block diagram showing a standard Viterbi decoder including a branch metric calculator;

DETAILED DESCRIPTION OF THE PREFERRED EMBODIMENTS

Figure 1:
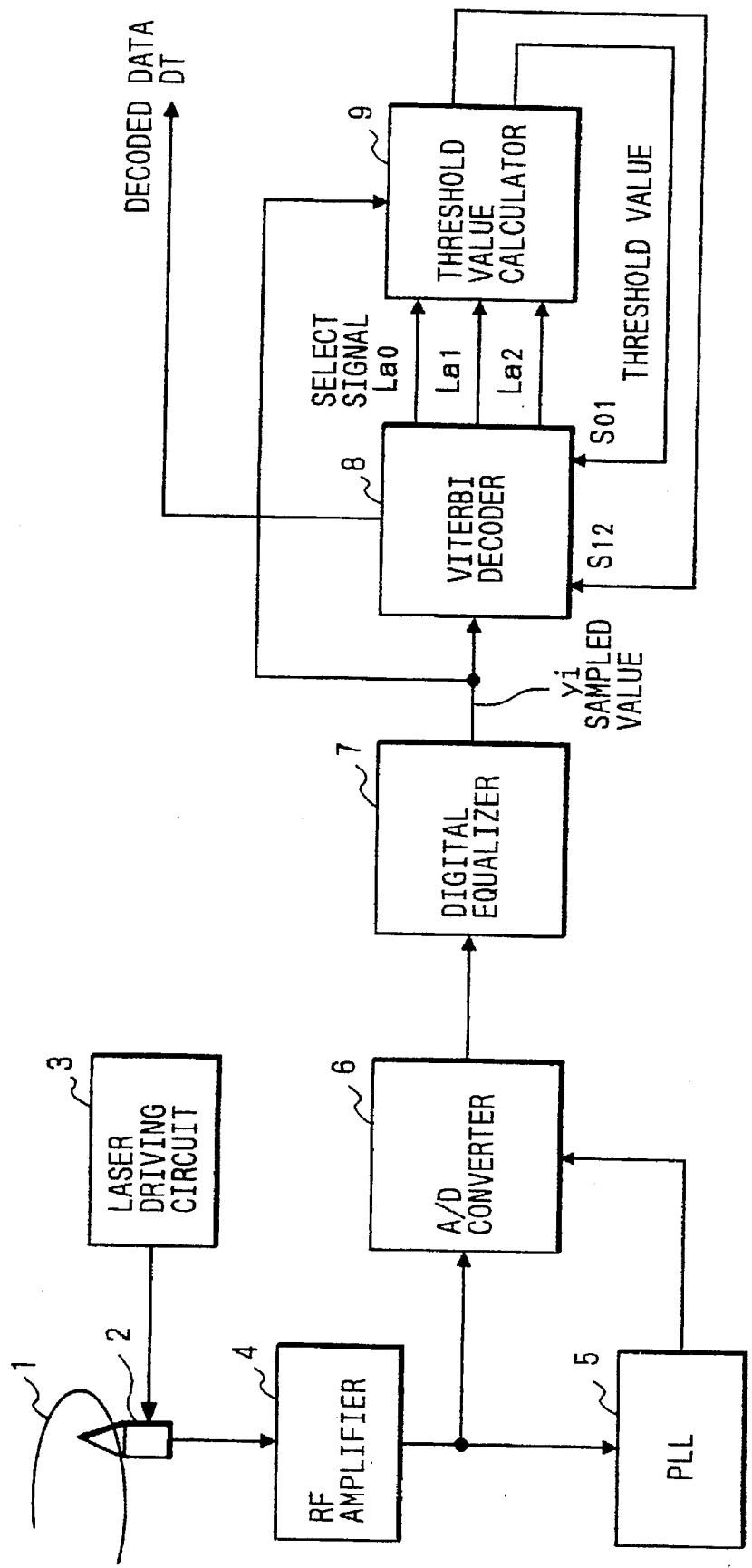
FIG. 1 is a schematic block diagram showing a digital signal detection circuit according to a first embodiment of this invention.

Referring now to the drawings, wherein like reference characters designate like or corresponding parts throughout the several views, FIG. 1 is a block diagram of a digital signal detection circuit according to a first embodiment of this invention. The digital signal detection circuit of FIG. 1 comprises an optical disk 1 which data have been recorded, a light pickup head 2 radiating a laser beam onto the optical disk 1 and reading out a reflected beam from the optical disk 1 to convert it into an electric signal, a laser driving circuit 3 driving the light pickup head 2, a RF amplifier 4 amplifying an regenerated analog signal read out by the light pickup head 2, a PLL 5 generating a sampling clock signal in synchronization with a phase of an output of the RF amplifier 4, an A/D converter 6 converting an analog output signal of the RF amplifier 4 into a digital signal at a sampling timing produced by the PLL 5, a digital equalizer 7 shaping a waveform of an output of the A/D converter 6, a Viterbi decoder 8 carring out Viterbi decoding based on an output signal of the digital equalizer 7, and a threshold calculator variably controlling assumptive sampled values to calculate a threshold value $S_{01}$ or $S_{12}$ necessary for decoding operation of the Viterbi decoder 8 from an input regenerated waveform and a decoded result output of the Viterbi decoder 8. Viterbi decoder 8 is a standard Viterbi decoder including branch metric calculator 8a which calculates the likelihood of assumption of signals input therein, as illustrated in FIG. 1A.

Figure 6:
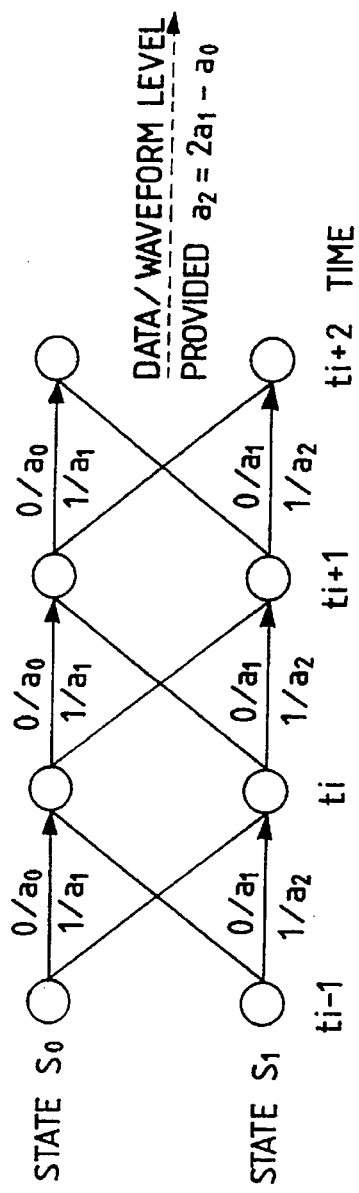
FIG. 6 is a trellis diagram used in the embodiments of this invention.
Figure 7:
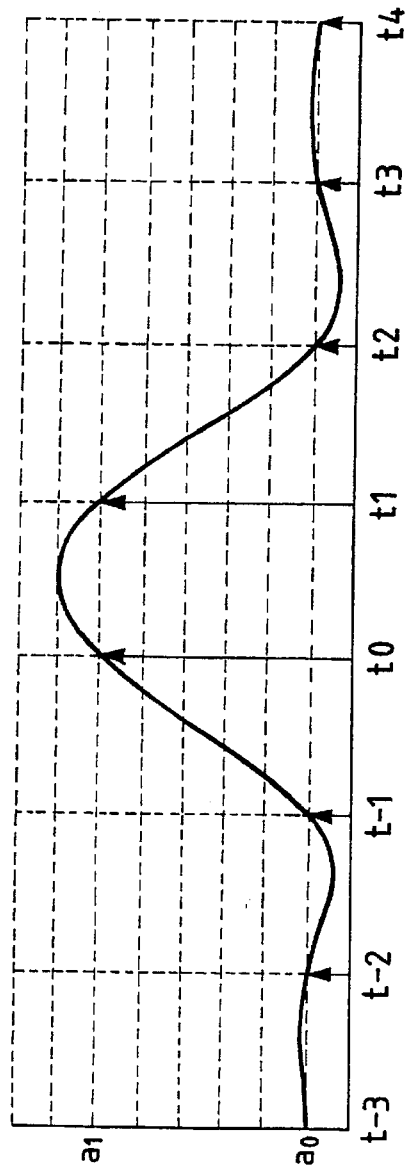
FIG. 7 is graphical representation of an ideal single regenerated waveform assumed to be of an output signal of a light pickup head.
Figure 8:
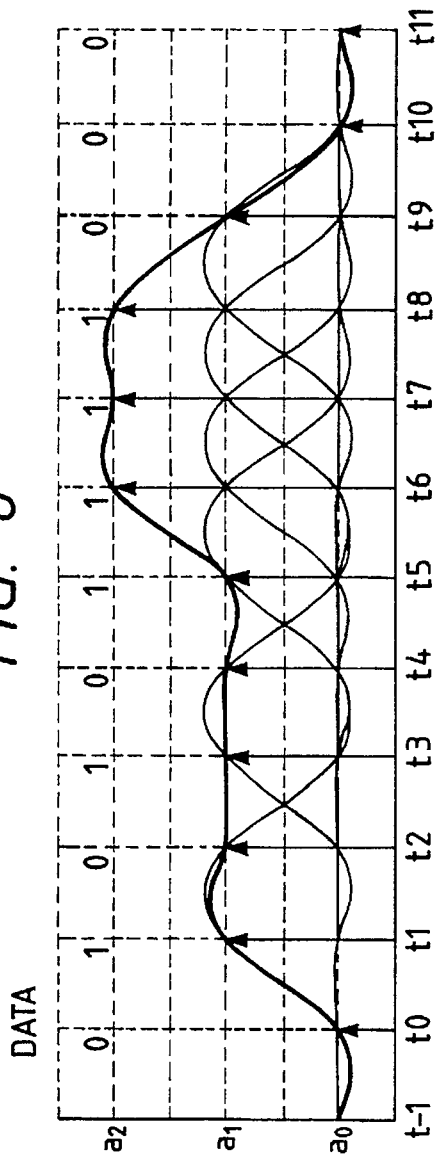
FIG. 8 is a graphical representation of a regenerated waveform of a sampled continuous data.
Figure 9:
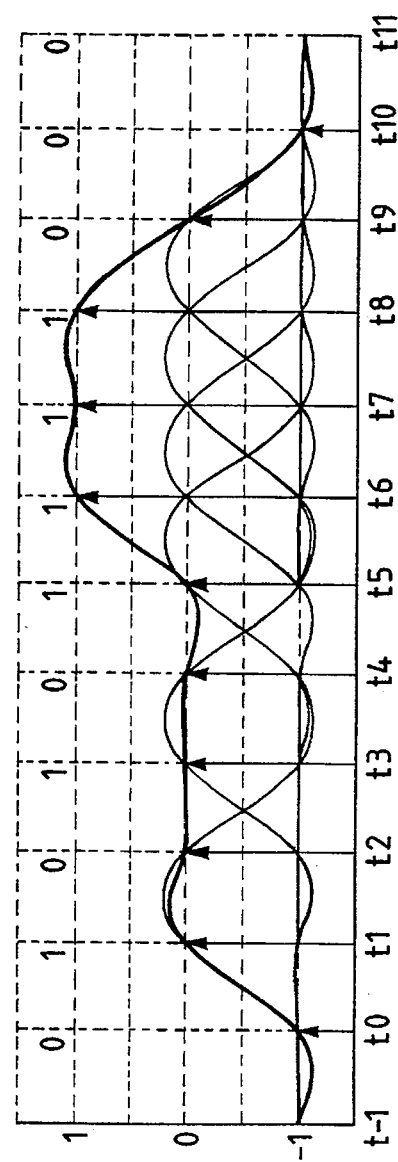
FIG. 9 is a graphical representation of a regenerated waveform obtained by passing the regenerated waveform of the continuous data through a HPF and an AGC circuit.
Figure 10:
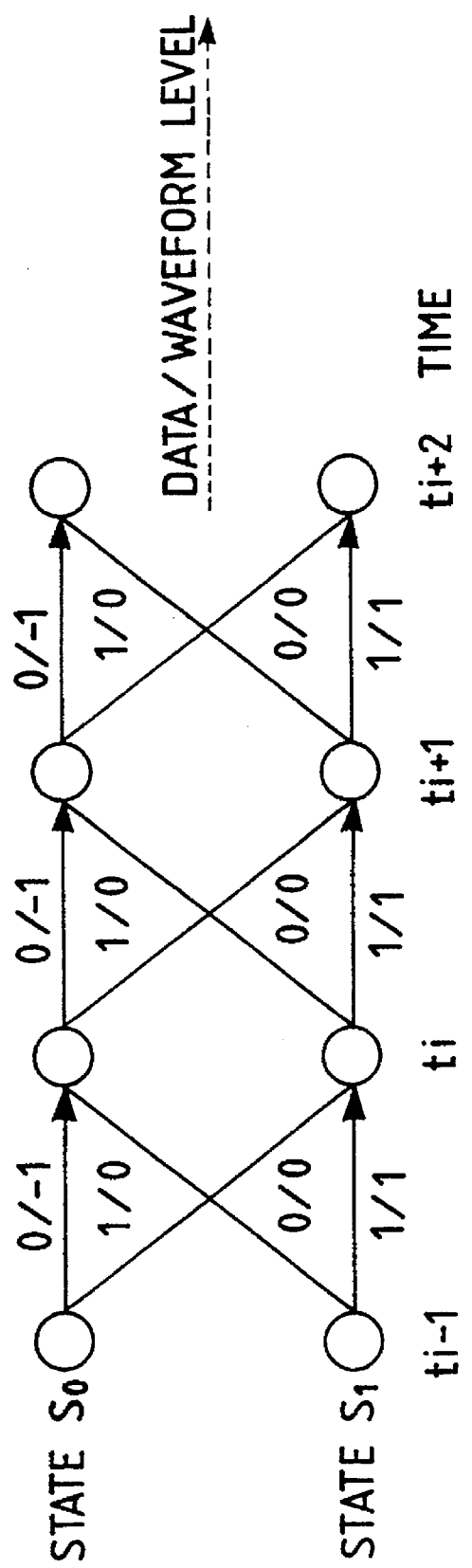
FIG. 10 is a conventional trellis diagram.
Figure 11:
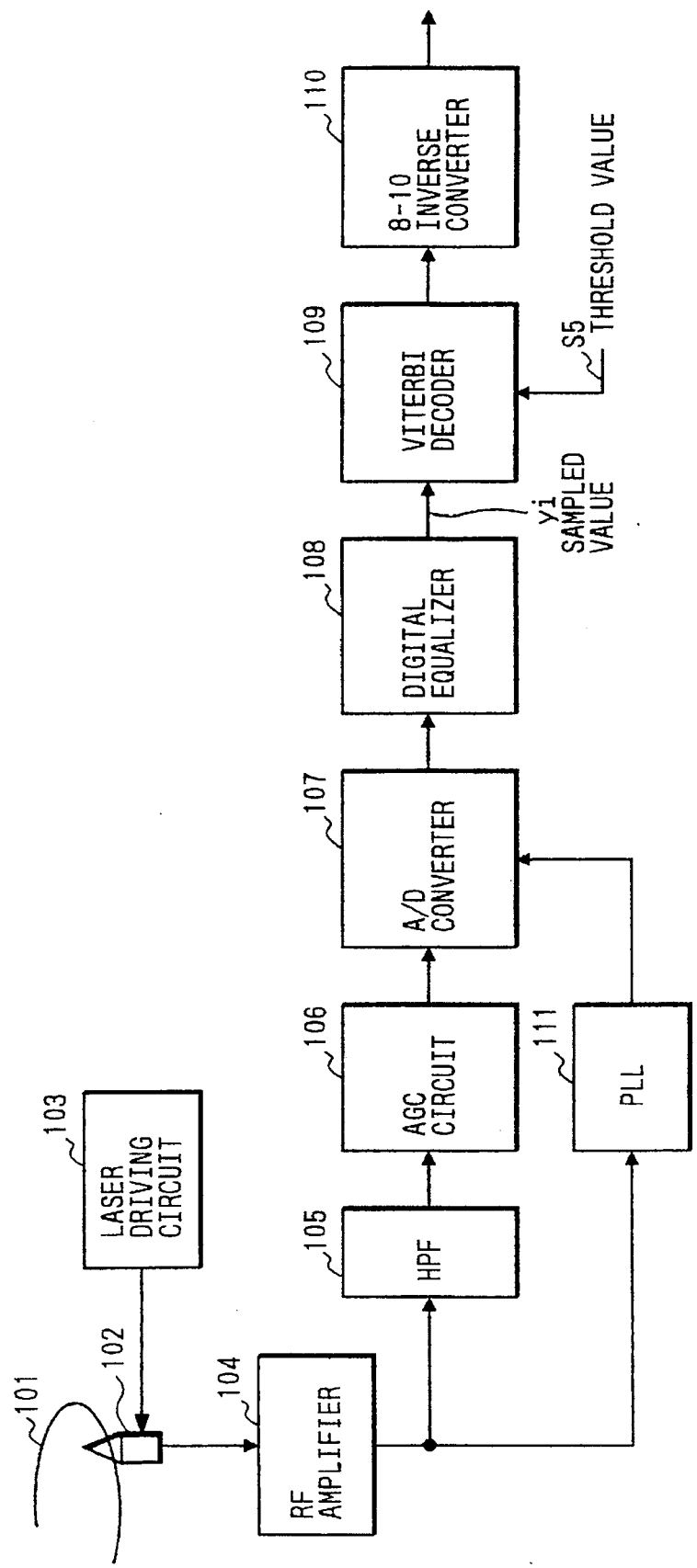
FIG. 11 is a schematic block diagram showing a conventional digital signal detection circuit.

In the digital signal detecting circuit of this embodiment with the above structure, an ideal single regenerated waveform obtained by reading out a regenerated analog waveform by the light pickup head 2 from the optical disk 1 is shown in FIG. 7. The ideal single regenerated waveforth is assumed to have a level value $a_1$ at sampling points $t_0$ and $t_1$ appearing in bit cycles, although having a level value $a_0$ (i.e., an optical offset component) at all sampling points except for the sampling points $t_0$, $t_1$. A range influenced by waveform interference is for two sampling points. When continuous data are recorded, a regenerated waveform is formed with an addition of the ideal single regenerated waveforms each of which is shifted by one sampling point to each other. The regenerated waveform of continuous data, as shown in FIG. 8, has three values $a_0$, $a_1$ and $a_2$ (provided that $a_2=2a_1-a_0$) of the level at sampling points. A relation between a recorded waveform in this case and waveform level values (assumptive sampled values) is represented in a trellis diagram shown in FIG. 6. The Viterbi decoder 8 carries out Viterbi decoding with the three level values $a_0$, $a_1$ and $a_2$ as assumptive sampled values.

The Viterbi decoding is carried out by calculating a Euclidean distance between an assumptive sampled value and an actually sampled value of each path at a sampling point according to the trellis diagram shown in FIG. 6, adding a sum total of the Euclidean distances for an input waveform up to one period to determine a sum total of each path, and selecting one having a smaller sum total of the Euclidean distance between the two paths which are inputted to each state as a surviving path. At this time, there are one path for each of two states. One having a smaller sum total of the Euclidean distances between the two surviving paths is selected as the maximum likelihood path to decide a path by going back a series of paths to a predetermined number of samples before (12 samples before in this case), determining decoded data from the path. A sum total of the Euclidean distances of the surviving paths calculated here is next used to calculate a sum total of Euclidean distances at the next sampling point. Repetition of these steps allows data decoding. Therefore, the decoded data DT are outputted delayed a predetermined number of samples.

The Viterbi decoder 8 outputs decoded data DT and select signals $La_0$, $La_1$ and $La_2$ of assumptive sampled values corresponding to the decoded data DT. The select signals of the assumptive sampled signals of the decoded data are tabulated in Table 1.

TABLE 1

| assumptive sampled value of decoded data | select signal | | |
|---|---|---|---|
| | $La_0$, | $La_1$, | $La_2$ |
| $a_0$ | H | L | L |
| $a_1$ | L | H | L |
| $a_2$ | L | L | H |

H: enable
L: disable

Calculation of an Euclidean distance is carried out in the following fashion. Since assumptive samples values are $a_0$, $a_1$ and as (provided $a_2=2a_1-a_0$) as stated before, a square of an error $r_{0i}$ when the assumptive sampled value is $a_0$ is given by:

$$r_{0i} = (y_i - a_0)^2 \qquad (7)$$
$$y_i^2 - 2y_i \cdot a_0 + a_0^2$$

A square of an error $r_{1i}$ when the assumptive sampled value is $a_1$ is given by:

$$r_{1i} = (y_i - a_i)^2 \qquad (8)$$
$$= y_i^2 - 2y_i \cdot a_1 + a_1^2$$

And a square of an error $r_{2i}$ when the assumptive sampled value is as is given by:

$$r_{2i} = (y_i - a_2)^2 \qquad (9)$$
$$= y_i^2 - 2y_i \cdot a_2 + a_2^2$$

To simplify calculations of the formulae (7), (8) and (9), $(y_i^2 - 2y_{i-a1} + a_1^2)$ is subtracted from each formula and the entire of each formula is divided with $2 \cdot (a_1 - a_0)$ to regularize it, the formula (7) becomes:

$$r'_{0i} = y_i - S_{01} \qquad (10)$$

where $$S_{01} = (a_1 + a_0)/2 \qquad (11)$$

The formula (8) becomes:

$$r'_{1i} = 0 \qquad (12)$$

And, the formula (9) becomes:

$$r'_{2i} = -y_i + S_{12} \qquad (13)$$

where $$S_{12} = (a_2 + a_1)/2 \qquad (14)$$

The above formulae (11), (12) and (13) are used to calculate an Euclidean distance. Threshold values $S_{01}$ and $S_{02}$ necessary to calculate the Euclidean distances are given by the formulae (11) and (14), determined by the threshold value calculator 9.

Figure 2:
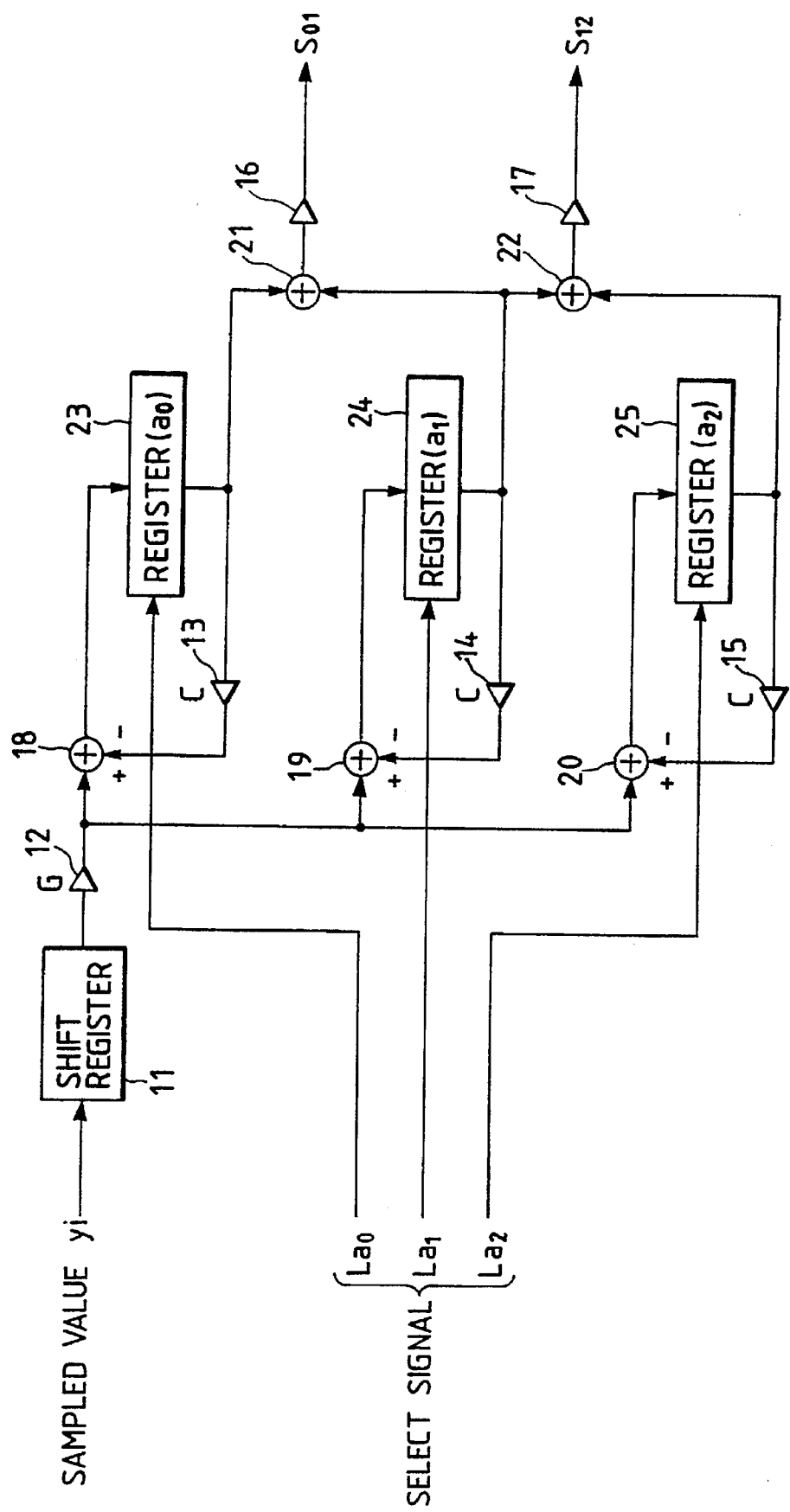
FIG. 2 is a schematic block diagram showing a threshold value calculator employed in the digital signal detection circuit Of FIG. 1.

FIG. 2 is a block diagram of a threshold value calculator 9 employed in the digital signal detection circuit of FIG. 1. The threshold value calculator 9 comprises a shift register 11 delaying a sampled value $y_i$ of an inputted regenerated waveform a predetermined number of samples in order to coincide the timing of the sampled value $y_i$ of the inputted regenerated waveform of the Viterbi decoder 8 with that of select signals $La_0$, $La_1$ and $La_2$ of assumptive sampled values for the actually sampled value $y_i$. Reference numerals 12, 13, 14, 15, 18 and 17 denote multipliers, 18, 19, 20, 21 and 22 denoting adders. Registers 23, 24 and 25 store the assumptive sampled values $a_0$, $a_1$ and $a_2$, respectively. A combination of the multipliers 12,13, the adder 18 and the register 23 forms an integrator to which is applied an output from the shift register 11, the register 23 of which outputs an output signal of the integrator. This integrator operates only when the select signal $La_0$ of the assumptive sampled value is enabled. Therefore, the integrator operates for a regenerated waveform that has been judged as the assumptive sampled value $a_0$ by the Viterbi decoder 8 and, stores then an optimum assumptive sampled value $a_0$ corresponding to the inputted waveform into the register 23. Similarly, a combination of the multipliers 12,14, the adder 19 and the register 24 serves as an integrator for a regenerated waveform that has been judged as an assumptive sampled value $a_1$ by the Viterbi decoder 8, then stores an optimal assumptive sampled value $a_1$ corresponding to the inputted waveform into the register 24. Also in the similar manner, a combination of the multipliers 12,15, the adder 20 and the register 25 serves as an integrator for a regenerated waveform that has been judged as an assumptive sampled value $a_2$ by the Viterbi decoder 8, then stores an optimal assumptive sampled value $a_2$ corresponding to the inputted waveform into the register 25.

Assuming that a coefficient of the multiplier 12 is G and a coefficient of the multipliers 13, 14 and 15 is C, a transfer function of each integrator H(z) is given by:

$$H(z)=G(1+CZ^{-1}) \quad (15)$$

When a DC gain of the integrator is 1, the coefficient G of the multiplier 12 is given by:

$$G=1+C(0<G\leq 1) \quad (16)$$

When G is decreased while keeping the relation in the formula (16), an integral time constant is increased, and when G is increased, the integral time constant is decreased. On the basis of the above fact, it is sufficient to set an optimal multiplying coefficient for the integrator. If the multiplying coefficient G is set at $2^{-n}$ (where n is an positive integer) besides the multiplying coefficient C is set at $2^{-n}-1$, the multiplier of the multiplying coefficient G may be formed with a n-bit shift register, and the multiplier of the multiplying coefficient C may be formed with a n-bit shift register and a subtractor, thereby realizing a threshold calculator with a small sized circuit.

A constant $S_{01}$ necessary to calculate an Euclidean distance is determined by, on the basis of the formula (11), adding an output of the register 23 with an output of the register 24 by the adder 21, then multiplying a result of the addition with 0.5 by the multiplier 16. In a similar manner, a constant $S_{12}$ is determined by, on the basis of the formula (14), adding an output of the register 24 with an output of the register 25 by the adder 22, then multiplying a result of the addition with 0.5 by the multiplier 17.

Each of the optimal assumptive sampled values stored in the respective register 23, 24 or 25 is integrated. Therefore, when a distorted regenerated waveform is read from the disk, the threshold values $S_0$ and $S_{12}$ can eliminate the effect of random noise and can follow slow DC offset fluctuation or amplitude fluctuation, whereby an optimal Viterbi decoding becomes possible. This ability to eliminate random noise is a function of the threshold value necessary to calculate a Euclidean distance in the Viterbi decoder, and not based on the regenerated waveform signal with the aid of functions such as the HPF and AGC circuit as in the conventional system.

As having been described the first embodiment of this invention, it should be noted that the number of assumptive samples values may be two, four or more, not limited to only three. In the above description, the threshold calculator 9 calculates an optimal assumptive sampled value corresponding to an inputted waveform for various data patterns using the integrator. However, it is possible to employ another technique (such as a predictive filter or the like) for various data patterns to calculate an optimal assumptive sampled value corresponding to the inputted waveform.

Figure 3:
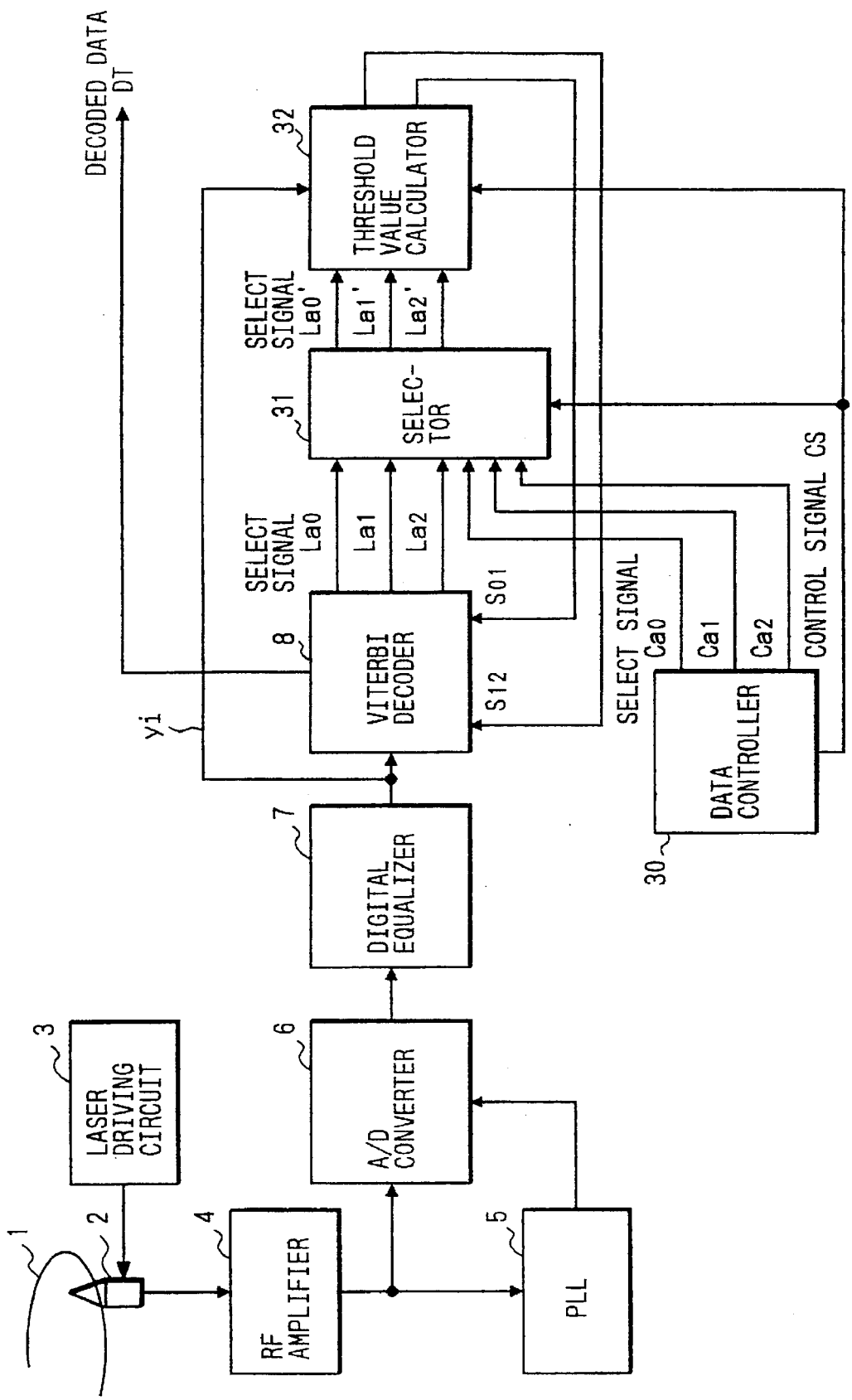
FIG. 3 is a schematic block diagram showing another digital signal detection circuit according to a second embodiment of this invention.

Now, description will be made of a digital signal detection circuit according to a second embodiment of the present invention. FIG. 3 is a block diagram of the digital signal detection circuit of the second embodiment. The same elements with those in the first embodiment are identified by the same reference characters, whose description will be omitted here. Different points of the digital signal detection circuit of the second embodiment from that of the first embodiment are that a data controller 30 and a selector 31 are newly added to the digital signal detection circuit of the first embodiment, and the threshold value calculator has a slightly different structure. In this embodiment, a model data region is provided on a portion of the optical disk 1, in which model data have been recorded. The data controller 30 makes a control signal CS HIGH when a regenerated signal is of the model data recorded in the model data region, and outputs select signals $Ca_0$, $Ca_1$ and $Ca_2$ used to select an assumptive sampled value corresponding to a sampled value of a regenerated signal of the model data. If the regenerated signal is not of the model data in the model data region, the data controller causes the control signal CS to be LOW and the select signals $Ca_0$, $Ca_1$ and $Ca_2$ to be uncertain.

A relation between the assumptive sampled value and the select signals is represented in the following Table 2.

TABLE 2

| assumptive sampled value of model data | select signal | | |
|---|---|---|---|
| | $Ca_0$ | $Ca_1$ | $Ca_2$ |
| $a_0$ | H | L | L |
| $a_1$ | L | H | L |
| $a_2$ | L | L | H |

H: enable
L: disable

The selector selects the select signals $Ca_0$, $Ca_1$ and outputted from the data controller 30 when the control signal CS is HIGH, selecting the select signals $La_0$, $La_1$ and $La_2$ outputted from the Viterbi decoder 8 when the control signal CS is LOW. A relation between the control signal CS and the output of the selector is shown in the following Table 3.

TABLE 3

| | output | | |
|---|---|---|---|
| CS | $La_0$' | $La_1$' | $La_2$' |
| HIGH | $Ca_0$ | $Ca_1$ | $Ca_2$ |
| LOW | $La_0$ | $La_1$ | $La_2$ |

Figure 4:
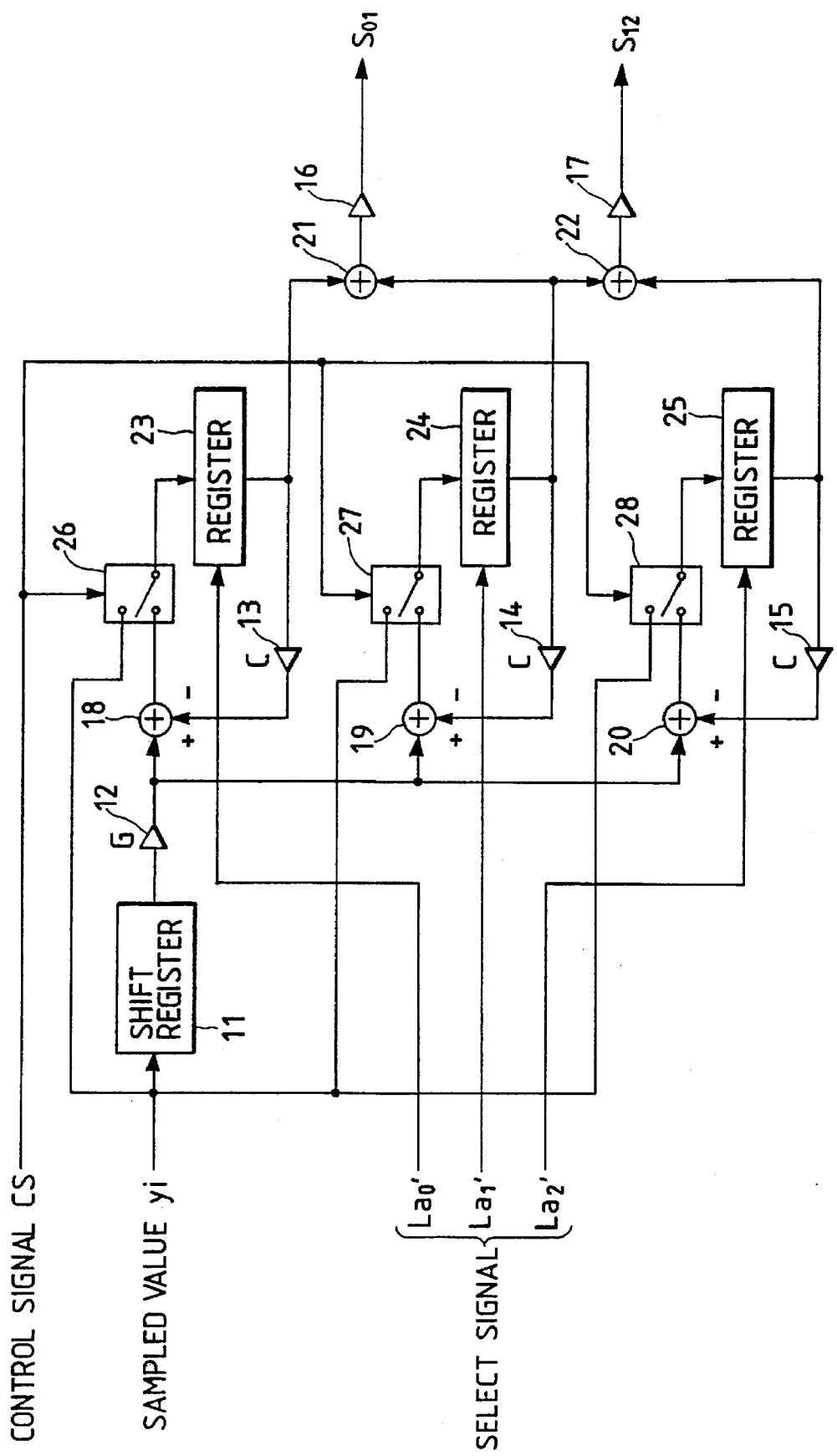
FIG. 4 is a schematic block diagram showing another threshold value calculator employed in the digital signal detection circuit of FIG. 3.

The threshold value calculator 31 has an internal structure as shown in FIG. 4. Selectors 26, 27 and 28 select a regenerated waveform signal when the control signal CS is HIGH, selecting an output signal of adders 18, 19 and 20 allowing an integration operation when the control signal CS is LOW.

In this embodiment, a model data region is provided in a portion of the optical disk 1 into which model data have been recorded. The light pickup head 2 reads out the model data in the model data region and stores their regenerated signals as assumptive sampled signals in corresponding registers 23, 24 and 25. In a normal data region after the model data region, the system operates in the same manner as the first embodiment.

The register, which is used to store the assumptive sampled value in the first embodiment, may directly store a sampled value of the model data as an initial value in this embodiment. It is possible to determine the initial value to be set in the register by integration or determine the initial value in another manner without using the model data and directly store it in the register.

Figure 5:
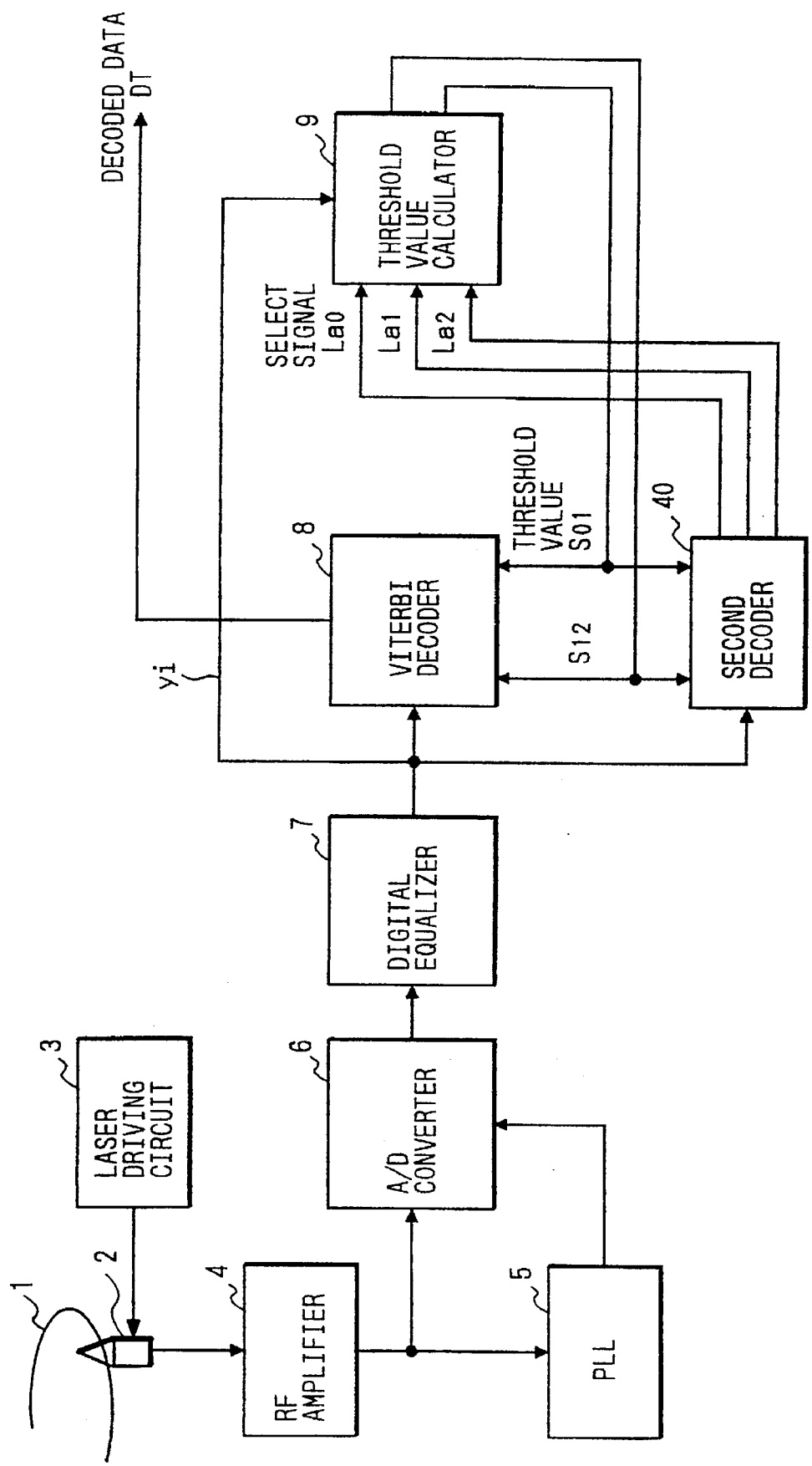
FIG. 5 is a schematic block diagram showing still anther digital signal detection circuit according to a third embodiment of this invention.

Now, description will be made of a digital signal detection circuit according to the third embodiment of this invention. The same elements with those in the first embodiment are identified by the same reference characters, whose description will be omitted here. FIG. 5 is a block diagram of the digital signal detection circuit of the third embodiment, which is provided with a second decoding circuit 40 in addition to the Viterbi decoder 8, which is a different point from the first embodiment. The second decoding circuit 40 enables a second decoding method where an inputted regenerated waveform $y_i$ may be calculated to bear a decoded result with a delay smaller than the Viterbi decoding technique and outputs select signals $La_0$, $La_1$ and $La_2$ of assumptive sampled values corresponding to the decoded result. Threshold value $S_{01}$ or $S_{12}$ is inputted as a constant necessary in a second decoding operation to the second decoding circuit 40.

The threshold value calculator 9 of the first embodiment determines threshold values $S_{01}$ and $S_{12}$ based on the input signal to the Viterbi decoder 8 and the select signals $La_0$, $La_1$ and $La_2$. In this embodiment, the threshold calculator 9 calculates threshold value $S_{01}$ and $S_{12}$ based on an output result of the second decoding circuit 40. In the first embodiment, the select signals $La_0$, $La_1$ and $La_2$ are outputted with a predetermined delay in relation with the inputted regenerated waveform (since a result of the Viterbi decoding delays predetermined number of samples), the threshold value calculator 9 therefore operates with a delay for predetermined number of samples in relation with the inputted waveform. To the contrary, the second decoding circuit 40 employed in the third embodiment outputs the select signals $La_0$, $La_1$ and $La_2$ with a smaller delay in relation with the inputted waveform so that the threshold value calculator 9 therefore may operate with a delay smaller than in the first embodiment. With the above arrangement, it is possible in the third embodiment to increase a following speed of the threshold values $S_{01}$ and $S_{12}$ when disturbances such as DC offset fluctuation, amplitude fluctuation or the like distort the inputted regenerated waveform.

It is possible in the digital signal detection circuit including the second decoding circuit in addition to the Viterbi decoder that the light pickup head regenerates data having been recorded in the model data region prepared on a portion of the recording medium and the threshold value calculator calculates a threshold value for a reference signal level value corresponding to various data patterns using the regenerated signal recorded in the model data region.

What is claimed is:

1. A digital signal detection circuit comprising:
   a threshold value calculator calculating a threshold value of assumptive sampled values corresponding to various data patterns of a regenerated signal obtained by regenerating data recorded on a recording medium by a regenerating head; and
   a Viterbi decoder carrying out Viterbi decoding of said regenerated signal with the threshold value determined by the threshold value calculator as a constant;
   said threshold value calculator variably controlling the threshold value using a decoded output of the Viterbi decoder and the regenerated signal corresponding to said decoded output.

2. A digital signal detection circuit comprising:
   a threshold value calculator calculating a threshold value of assumptive sampled values corresponding to various data patterns of a regenerated signal obtained by regenerating data recorded on a recording medium by a regenerating head; and
   a Viterbi decoder carrying out Viterbi decoding of said regenerated signal with the threshold value determined by the threshold value calculator as a constant;
   said threshold value calculator variably controlling the threshold value using a decoded output of the Viterbi decoder and the regenerated signal corresponding to said decoded output;
   wherein said threshold value calculator further comprises integrator means for integrating the regenerated signal responsive to the assumptive values and the decoded output generated by said Viterbi decoder and for generating integrated signals, and
   wherein said threshold value calculator generates the threshold value responsive to the integrated signals.

3. A digital signal detection circuit according to claim 2, wherein said integrated signals are substantially optimum assumptive values corresponding to the regenerated signal.

4. A digital signal detection circuit according to claim 2, wherein the threshold value includes first and second threshold values, and
   wherein said threshold value calculator generates the first and second threshold values responsive to the following equation:

$$S01=(a1+a0)/2$$

$$S12=(a2+a1)/2,$$

where S01 is the first threshold value, S12 is the second threshold value, and a0, a1 and a2 are the assumptive values.

5. A digital signal detection circuit according to claim 1, wherein said Viterbi decoder comprises a branch metric calculator, and
   wherein said threshold value calculator is provided separately from said branch metric calculator and from said Viterbi decoder.

6. A digital signal detection circuit according to claim 5, wherein said threshold value calculator variably controls the threshold value responsive to DC offset fluctuations, or amplitude fluctuations of the regenerated signal.

7. A digital signal detection circuit comprising:
   a threshold value calculator calculating a threshold value of assumptive sampled values corresponding to various data patterns of a regenerated signal obtained by regenerating data, said threshold value calculator including an integrator integrating the regenerated signal responsive to the assumptive values and a decoded output and generating the threshold value responsive thereto, and said threshold value calculator variably controlling the threshold value using the decoded output and the regenerated signal; and
   a Viterbi decoder, responsively connected to said threshold value calculator and executing a Viterbi decoding of said regenerated signal with the threshold value determined by the threshold value calculator as a constant, and generating the decoded output responsive thereto.

* * * * *